(12) United States Patent
Rao et al.

(10) Patent No.: US 9,829,718 B2
(45) Date of Patent: Nov. 28, 2017

(54) METHOD FOR RESISTING NOISE OF CO-PHASING SYSTEM OF DISPERSED FRINGE SENSOR AND OPTICAL SYSTEM

(71) Applicant: The Institute of Optics and Electronics, The Chinese Academy of Sciences, Sichuan (CN)

(72) Inventors: Changhui Rao, Sichuan (CN); Yang Li, Sichuan (CN); Shengqian Wang, Sichuan (CN)

(73) Assignee: The Institute of Optics and Electronics, The Chinese Academy of Sciences, Sichuan (CN)

( * ) Notice: Subject to any disclaimer, the term of this patent is extended or adjusted under 35 U.S.C. 154(b) by 0 days.

(21) Appl. No.: 15/266,880

(22) Filed: Sep. 15, 2016

(65) Prior Publication Data

US 2017/0074639 A1 Mar. 16, 2017

(30) Foreign Application Priority Data

Sep. 16, 2015 (CN) .......................... 2015 1 0591280

(51) Int. Cl.
*G02B 27/58* (2006.01)
*G02B 23/12* (2006.01)
*G02B 23/02* (2006.01)

(52) U.S. Cl.
CPC ............. *G02B 27/58* (2013.01); *G02B 23/02* (2013.01); *G02B 23/12* (2013.01)

(58) Field of Classification Search
CPC ........ G02B 27/58; G02B 23/02; G02B 23/12; G01B 9/02055; G01B 9/02067;
(Continued)

(56) References Cited

U.S. PATENT DOCUMENTS 9,213,190 B2 * 12/2015 Trail ...................... G02B 23/06

OTHER PUBLICATIONS

Shi et al (Experimental verification of dispersed fringe sensing as a segment phasing technique using the Keck telescope, Applied Optics, vol. 43, No. 23, Aug. 2004).*
(Continued)

*Primary Examiner* — Tarifur Chowdhury
*Assistant Examiner* — Jonathon Cook
(74) *Attorney, Agent, or Firm* — Schwegman Lundberg & Woessner, P.A.

(57) ABSTRACT

The present disclosure provides a method for improving capability of resisting image noise of a co-phasing system of a dispersed fringe sensor. The method comprises the following steps: carrying out a coarse co-phasing adjustment by utilizing the dispersed fringe sensor until the coarse co-phasing is stabilized in a closed loop; collecting a two dimensional dispersed fringe image by the dispersed fringe sensor; superposing the dispersed fringe image along a dispersed direction so as to convert the two dimensional dispersed fringe image to a one dimensional image along an interferential direction; extracting peak values of the main peak, a left side lobe and a right side lobe of the one dimensional image along the interferential direction, and calculating corresponding piston error value of the image by carrying out a Left-subtracting-right LSR algorithm on these peak values.

8 Claims, 2 Drawing Sheets

(58) Field of Classification Search
CPC .............. G01B 9/02068; H04B 7/0636; H04B 7/0615; H04B 7/0617; G05B 2219/36417
USPC ........................................................ 356/508
See application file for complete search history.

(56) References Cited

OTHER PUBLICATIONS

Dam et al (Measuring Segment Piston with a Dispersed Fringe Sensor on the Giant Magellan Telescope, Adaptive Optics for Extremely Large Telescopes 4—Conference Proceedings, 2015).*
Li et al (Dispersed-fringe-accumulation-based left-subtract-right method for fine co-phasing of a dispersed fringe sensor, vol. 56, No. 15 / May 20, 2017 / Applied Optics).*
Zhao, Weirui, et al., "Active cophasing and aligning testbed with segmented mirrors", Optics express 19.9, (2011), 8670-8683.

* cited by examiner

METHOD FOR RESISTING NOISE OF CO-PHASING SYSTEM OF DISPERSED FRINGE SENSOR AND OPTICAL SYSTEM

CROSS-REFERENCE TO RELATED APPLICATION(S)

This application claims priority to Chinese Application No. 201510591280.2, filed on Sep. 16, 2015 and entitled "METHOD FOR RESISTING NOISE OF CO-PHASING SYSTEM OF DISPERSED FRINGE SENSOR AND OPTICAL SYSTEM," which is incorporated herein by reference in its entirety.

TECHNICAL FIELD

The present disclosure relates to a method for improving capability of resisting image noise of a co-phasing system of a dispersed fringe sensor by extracting piston error and a corresponding optical system.

BACKGROUND

The dispersed fringe sensor has been applied as a piston error detector for James Webb Space Telescope (JWST) and Giant Magellan Telescope (GMT) in United State. However, since it is influenced by noise of a dispersed fringe image and the method for extracting the piston error, the dispersed fringe sensor is only utilized during a rough co-phasing stage for these two telescopes.

At present, a method for improving a detecting capability of a dispersed fringe sensor in a fine co-phasing stage is proposed (cf. W. Zhao and G. Cao, "Active co-phasing and aligning testbed with segmented mirrors", Opt. Express, 19(9), 8670-8683 (2011)). In particular, the method extracts an interference image in one dimension of the interference direction from a dispersed fringe image, and then extracts a displacement when a piston error of an offset of main peak in an interference intensity distribution of the one dimensional image is zero, and finally calculates a piston error required for the fine co-phasing in conjunction with a fringe cycle of a corresponding wavelength of the one-dimensional interference image:

$$\text{piston}=\Delta y/T(\lambda).$$

Although such a method enhances a detecting precision of the dispersed fringe sensor and meets the requirements of the fine co-phasing, such a method has a poor capability of resisting image noise since it only utilizes one dimensional information of the two dimensional dispersed fringe image. During actual operation of an astronomical telescope, an illumination of start light functioning as a light source is weak and there is noise in a target surface of a camera, so a signal-to-noise ratio of the dispersed fringe image at this moment will not reach the same ideal level as that of the laboratory. Thus, an actual value in use for such a method is not good enough. Furthermore, such a method needs to calibrate the wavelength corresponding to different spatial positions of the target surface of the camera and calibrate the position at which the piston error of the main peak in the interference intensity distribution is zero, which increases engineering complexity and cost without doubt. More importantly, the present method is not sensitive to the translation movement of the pixel of the image, and has strong engineering feasibility which the current fine method (MPP) does not have.

SUMMARY

The technical problem to be solved by the present invention is to overcome deficiencies of poor capability of resisting noise and engineering complexity of the method of detecting piston error during the fine co-phasing of the dispersion fringe. The present disclosure provides a method for distinctly improving capability of resisting noise for detecting the piston error of a dispersed fringe sensor during fine co-phasing and a corresponding optical system. Such a method hardly increases engineering complexity and cost.

The present disclosure provides a method for improving capability of resisting image noise of a co-phasing system of a dispersed fringe sensor applied for an optical system comprising a main mirror system, a dispersed fringe sensor and a processing device, which comprises the following steps: carrying out a coarse co-phasing adjustment on the main mirror system by utilizing the dispersed fringe sensor until the coarse co-phasing of the main mirror system is stabilized in a closed loop; collecting a two dimensional dispersed fringe image by the dispersed fringe sensor; the processing device is configured to carry out the following steps: 1) superposing the dispersed fringe image along the dispersed direction so as to convert the two dimensional dispersed fringe image to a one dimensional image along an interferential direction; 2) extracting peak values of the main peak, a left side lobe and a right side lobe of the one dimensional image along the interferential direction, and calculating corresponding piston error value of the image by carrying out a Left-subtracting-right (LSR) algorithm on these peak values; and inputting the calculated piston error value to a closed loop control algorithm to get a control signal and eliminating the piston error according to the control signal. The present method displays the calculated piston error value and inputs it into the closed-loop control algorithm to get the control signal, and controls an actuate system for the main mirror to eliminate the piston error to get the object of resisting noise and fine co-phasing.

Preferably, the main mirror in the co-phasing system may be a segmented mirror, an optical synthetic imaging aperture or a long baseline interferential telescope.

Preferably, the method may further comprise displaying the calculated piston error value.

Preferably, a moving mechanism of the main mirror in the co-phasing system is controlled in a feedback manner according to the control signal to eliminate the piston error.

According to another aspect of the present disclosure, there is also provides an optical system comprising a main mirror system, a dispersed fringe sensor and a processing device, wherein the main mirror system is configured to collect optical signals; the dispersed fringe sensor is configured to carry out a coarse co-phasing adjustment on the main mirror system until the coarse co-phasing of the main mirror system is stabilized in a closed loop, and is configured to collect two dimensional dispersed fringe images; the processing device is configured to carry out the following steps: superposing the dispersed fringe image along a dispersed direction so as to convert the two dimensional dispersed fringe image to a one dimensional image along an interferential direction; extracting peak values of the main peak, a left side lobe and a right side lobe of the one dimensional image along the interferential direction, and calculating corresponding piston error value of the image by carrying out a Left-subtracting-right (LSR) algorithm on these peak values; and inputting the calculated piston error value to a closed loop control algorithm to get a control signal and eliminating the piston error according to the control signal.

Preferably, the optical system may further comprise a feedback adjusting device which is configured to receive the control signal from the processing device, and to control an actuate system for the main mirror in the co-phasing system in a feedback manner according to the control signal to eliminate the piston error.

In particular, the LSR (Left Subtract Right) algorithm is based on a principle in which a differential value of the left and right side lobes is zero when far field intensities of two beams of light reach their maximum values, i.e. when a piston phase difference is $2n\pi$, $\pi$, and the differential value of the left and right side lobes is maximal when the piston phase difference is $n\pi \cdot \pi$. Its particular algorithm is shown as follows: firstly, one dimensional light intensity is obtained from a two-dimensional CCD light intensity; the one dimensional light intensity is searched to get a maximal light intensity; the one dimensional light intensity is searched towards the left side from the maximal light intensity to find a first sub-peak as a left lobe peak Lobe; similarly, the one dimensional light intensity is searched towards the right side from the maximal light intensity to find a first sub-peak as a right side lobe peak $R_{lobe}$. The value of the main peak is $M_{peak}$. When the piston feature is calculated, it is always to subtract the right side lobe peak from the left side lobe peak to get a LSR of different piston within one wavelength as a following formula:

$$LSR = (L_{lobe} - R_{lobe})/M_{peak}.$$

When the piston phase difference is an integral times of the wavelength, LSR=0; and when the piston phase difference is an odd times of half wavelength, the absolute value of LSR tends to be maximal. The numerical value of LSR may be normalized to be within (−1, +1).

The present method completely utilizes two dimensional information of the dispersed fringe image, and implements an equivalent effect of averaging filter by a specific process according to properties of the dispersed fringe image, and guarantees that the piston error information desired for the fine co-phasing will not be lost. The present disclosure also incorporates a LSR algorithm for extracting piston error without calibrating the wavelength at the target surface to get the piston error.

Without modifying the original dispersed fringe sensor, the present method completely utilizes two dimensional information of the dispersed fringe image according to the property of the dispersed fringe to reach the object of enhancing the signal to noise ratio of effective information. Furthermore, by incorporating the LSR algorithm for extracting piston error to calculate the piston error, the object of meeting the requirement of high co-phasing without calibrating the engineering items may be implemented.

Based on an theoretical analysis, the method of the present disclosure gets a noise reduction ratio (NRR) with respect to the existing method for detecting piston error during fine co-phasing as follows:

$$NRR = N(1/N)^2 = 1/N,$$

In which N represents the times of sampling (numbers of pixels) of the dispersed fringe sensor along the dispersed direction. As can be seen from it, the method of the present disclosure distinctly improves capability of resisting noise of the co-phasing system of the dispersed fringe sensor over the existing method for detecting piston error in the fine co-phasing process in which only the intensity distribution along the one dimensional interferential direction.

The present disclosure has the following advantages over the prior art.

1) The present invention utilizes a calculating method by superposing and summing the dispersed fringe image collected through the dispersed fringe sensor to compress it along the dispersed direction according to the property of the dispersed fringe. The summing process implements the function of filtering and reduces influence of random noise on the real signal to reach the object of improving precision. Such a process completely utilizes two dimensional information of the dispersed fringe image and enhances the signal-to-noise ratio after compression, so that the extracted piston error has an ability of resisting noise. However, the existing method can't possess a capability of improving the signal-to-noise ratio and its extracted piston error is directly influenced by noise. The present invention enhances optical signals by the summing process and decreases requirements of the light intensity.

2) With respect to the existing fine co-phasing method, the present invention does not need to calibrate the corresponding wavelength along the dispersed direction on the target surface of the camera in the dispersed fringe sensor, and also does not need to calibrate the position at which the piston error of the main peak in the interference intensity distribution is zero. Thus, the present invention has advantages of not increasing engineering complexity and cost. More importantly, the present method is not sensitive to the translation movement of the pixel of the image, and has strong engineering feasibility which the current fine method does not have.

DETAILED DESCRIPTION

The present invention will be further illustrated in detail in conjunction with the following embodiments.

Figure 1:
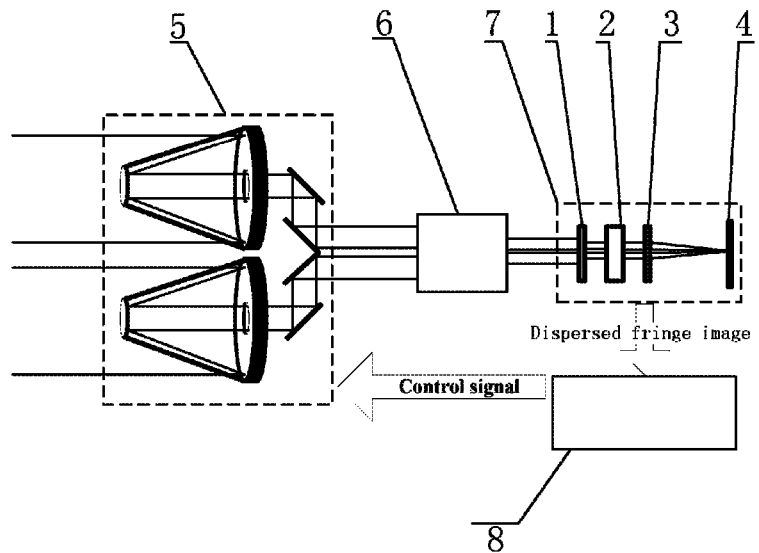
FIG. 1 is a schematic view of a system of improving capability of resisting noise of a co-phasing system of a dispersed fringe sensor according to the present invention, in which the reference sign 1 represents an interference region selecting aperture of the dispersed fringe sensor (7); the reference sign 2 represents a dispersed element of the dispersed fringe sensor (7); the reference sign 3 represents an imaging lens of the dispersed fringe sensor (7); the reference sign 4 represents the target surface of the camera of the dispersed fringe sensor; the reference sign 5 represents a main mirror system; the reference sign 6 represents an optical matching system; the reference sign represents the dispersed fringe sensor; and the reference sign 8 represents a computer.

FIG. 1 is a schematic view of a system of improving capability of resisting noise of a co-phasing system of a dispersed fringe sensor according to the present invention. As shown in FIG. 1, the co-phasing system of the dispersed fringe sensor according to the present invention is constituted of a main mirror system 5, a dispersed fringe sensor 7 and a computer 8. The computer 8 may be any processing devices which processes data. Alternatively, the optical system may further comprise an optical matching system 6 for implementing optical matching between the main mirror system and the dispersed fringe sensor. In particular, the dispersed fringe sensor comprises an interference region selecting aperture 1 of the dispersed fringe sensor (7), a dispersed element 2 of the dispersed fringe sensor (7), an imaging lens 3 of the dispersed fringe sensor (7) and a target surface 4 of the camera of the dispersed fringe sensor. For example, the dispersed fringe image collected by the dispersed fringe sensor has 512×32 pixels in size and 8 bits in data bite.

An embodiment of the present disclosure provides a method for improving capability of resisting image noise of a co-phasing system of a dispersed fringe sensor applied for an optical system comprising a main mirror system, a dispersed fringe sensor and a processing device, which comprises the following steps: carrying out a coarse co-phasing adjustment on the main mirror system by utilizing the dispersed fringe sensor until the coarse co-phasing of the main mirror system is stabilized in a closed loop; collecting a two dimensional dispersed fringe image by the dispersed fringe sensor; the processing device is configured to carry out the following steps: 1) superposing the dispersed fringe image along a dispersed direction so as to convert the two dimensional dispersed fringe image to a one dimensional image along an interferential direction; 2) extracting peak values of the main peak, a left side lobe and a right side lobe of the one dimensional image along the interferential direction, and calculating corresponding piston error value of the image by carrying out a Left-subtracting-right (LSR) algorithm on these peak values; and inputting the calculated piston error value to a closed loop control algorithm to get a control signal and eliminating the piston error according to the control signal.

In particular, at a step of a, the piston error between sub-mirrors of the main mirror system is larger than a half of wavelength, so it needs to carry out the coarse co-phasing firstly. The dispersed fringe sensor is utilized to carry out the coarse co-phasing adjustment on the main mirror until the piston error between the sub-mirrors of the main mirror is within a half of the wavelength and is stabilized in a closed loop. Then, the method for extracting the piston error is implemented in the computer to extract the piston error.

Figure 2:
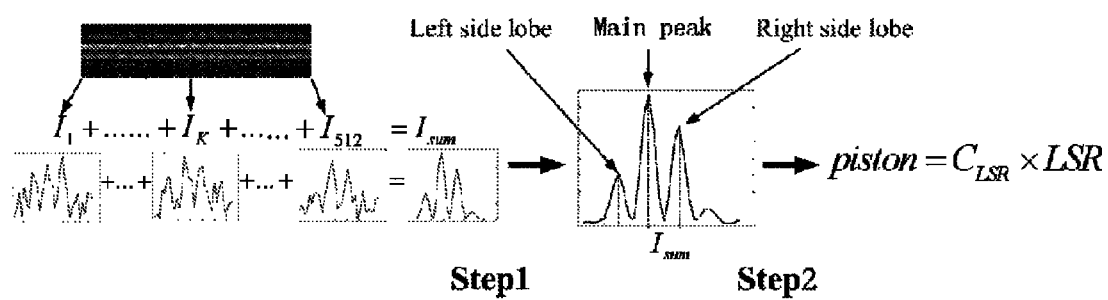
FIG. 2 is a schematic view of a step of extracting the piston error having a capability of resisting noise according to the present invention.

At a step of b, as shown in FIG. 2, the computer carries out the following processes on the dispersed fringe image collected and transmitted by the dispersed fringe sensor.

Figure 3:
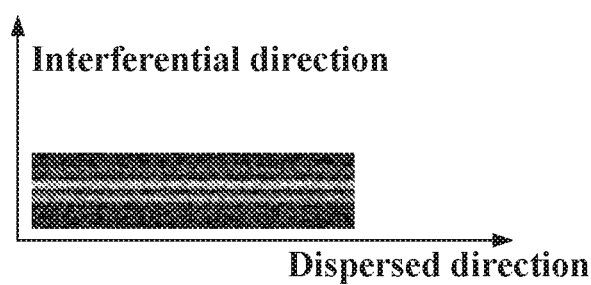
FIG. 3 shows definition of dispersed direction and interferential direction of the dispersed fringe image.

1) The dispersed fringe image is superposed for 511 times along a dispersed direction (the direction shown in FIG. 3) so as to convert the dispersed fringe image from a two dimensional dispersed fringe image to a one dimensional image $I_{sum}$ along an interferential direction by superposing. The one dimensional image only has a size of 1×32 pixels.

2) Peak values (size of the pixel value) of the main peak, a left side lobe and a right side lobe of the one dimensional image along the interferential direction are extracted, and corresponding piston error value of the image is calculated by carrying out a Left-subtracting-right (LSR) algorithm on these peak values.

At a step of c, the calculated piston error value which is calculated at the step of b is displayed and input into the closed-loop control algorithm to get the control signal, and an actuate system for the main mirror is controlled to eliminate the piston error to get the object of resisting noise and fine co-phasing.

By utilizing the steps as mentioned above, during the stage of fine co-phasing, the method of the present invention distinctly reduces the influence of the noise of the dispersed fringe image on the process of extracting the piston error, so as to distinctly improve the capability of resisting noise of the whole co-phasing system. By utilizing the method of the present invention, an theoretic noise reduction ratio of the present invention with respect to a conventional method for measuring the piston error in the co-phasing system is shown as:

NRR=1/512.

Thus, it greatly enhances the capability of resisting noise of the co-phasing system. It can also be seen from FIG. 2 that when the conventional method is utilized, a position of the main peak of the $k^{th}$ dimensional interferential image $I_K$ in the dispersed fringe image along the interferential direction will be calculated, which is distinctly influenced by noise. Since the extracted effective information of the main peak has been seriously polluted by noise, even if the position of the main peak is extracted, there will be a great error due to presence of noise. On the contrary, if the dispersed fringe image is processed by the step b of extracting the piston error according to the present invention, the respective peaks of the processed one dimensional image $I_{sum}$ have legible envelopes and information about the respective peaks are less influenced by noise and is easy to be extracted. Thus, the extracted piston error will be less influenced by noise than the conventional method.

In the implementation of the method according to the present invention, the summing process superposes signal intensities of M pixels together. These signal intensities contain light intensity signal $S_k$ and noise signal $r_k$. Since the piston error is very small (smaller than one wavelength), the light intensity signal of the pixel along the dispersed direction of the dispersed fringe are approximately identical to $S_0$. The image noise is generally processed as a gauss white noise, and it is assumed that in one single pixel signal, the desired value for the white noise signal is $E_0$ with a standard deviation of $\sigma_0^2$.

By superposing, the light intensity signal n the superposing result of the signals becomes:

$$S_{sum} \approx MS_0 \quad (1)$$

The distribution of the noise signal becomes:

$$E(r_{sum}) = E(Mr_k) = ME_0 \quad (2)$$

$$D(r_{sum}) = D(\bar{r}) = \frac{1}{M^2} D\left(\sum r_k\right) = \frac{1}{M^2} M\sigma^2 = \frac{\sigma^2}{M} \quad (3)$$

Thus, the process superposing may be equivalent to the situation in which the superposed light intensity signal is increased by M times with respect to an original light intensity signal of the pixel. Although the desired value for the image noise is increased, its standard deviation is decreased, which represents that the noise fluctuation between the superposed signals are much flatter and intends to be identical to each other. FIG. 2 also shows such a process. Such a process decreased influence of the noise on the light intensity signal so that the light intensity signal is conspicuous among the superposed signals. Such a process equivalently increases the superposed light signals of the pixel and increases the signal-to-noise ratio, so that it is much easier to extract shapes of the interference light spot. Thus, such the process correspondingly deceases requirement of the dispersed fringe on the light intensity so that the dispersed fringe sensor may measure the piston error at a weaker light intensity.

The extracting method according to the present invention completely utilizes two dimensional information of the dispersed fringe image, and has a better capability of resisting noise than the existing MMP algorithm in which only one dimension-information is utilized. It is known that a differential equation of an averaging filter in signal field is shown as follows:

$$y(n) = \frac{1}{n}\sum_{0}^{N-1} x(n-k). \tag{5}$$

As can be seen from it, the superposing process along the dispersed direction in the method of the present invention is a process of averagely filtering. Since the averagely filter is a low-pass filter, the extracting method of the present invention may effectively removes random noise of the image and enhances the signal-to-noise ratio. Thus, the present invention has a better capability of resisting noise.

For the existing MPP method, its noise reduction ratio NRR is shown as:

$$NRR = N(1/N)^2 = 1/N \tag{6}$$

Thus, with respect to the MPP algorithm in which only the intensity along the interference direction is utilized to solve the piston error, the capability of resisting noise of the present method is N (numbers of the pixels along the dispersed direction) times than that of MPP. Furthermore, the LSR method is utilized to guarantee then the present invention does not need to calibrate the corresponding wavelength on the target surface of the camera in the dispersed fringe sensor when the piston error is extracted, and also does not need to calibrate the position at which the piston error of the main peak in the interference intensity distribution is zero.

The method of the present invention may improves the capability of resisting noise of the actual system, increases detecting precision and reduces requirements of the sensor to lightness of a guiding star with respect to the existing MPP method. That is to say, for the guiding start with the same lightness, the present invention may reduce exposure time of the sensor to reach the object of improving detecting frequency.

The method of the present invention may meet the co-phasing requirement of outfield of an actual telescope, which can't be meted by in the existing methods. In a co-phasing system for actual outfields, the fringe image may be moved on the camera of the sensor over time. The existing MPP method calculates the piston error by real-time position of the main fringe with respect to the reference position, so it is sensitive to the translation movement of the pixel of the image (between the calibrated and measured images). Such sensitivity will introduce measuring error, which should be avoided in an actual system. However, in the present invention as shown in FIG. 1, the method of the present invention utilizes the LSR method to extract the piston error from the one dimensional fringe generated by superposing. Since the LSR method gets the piston error from the intensities between different intensity peaks in the interferential image, the LSR method is not sensitive to the translation movement of the image during the process of extracting the piston error. Thus, the LSR method does not utilize information about the position of the fringe, and avoids sensitivity to the translation movement of the pixel of the image.

Another embodiment of the present disclosure also provides an optical system. As shown in FIG. 1, the optical system comprises a main mirror system, a dispersed fringe sensor and a processing device, wherein the main mirror system is configured to collect optical signals; the dispersed fringe sensor is configured to carry out a coarse co-phasing adjustment on the main mirror system until the coarse co-phasing of the main mirror system is stabilized in a closed loop, and is configured to collect two dimensional dispersed fringe images; the processing device is configured to carry out the following steps: superposing the dispersed fringe image along a dispersed direction so as to convert the two dimensional dispersed fringe image to a one dimensional image along an interferential direction; extracting peak values of the main peak, a left side lobe and a right side lobe of the one dimensional image along the interferential direction, and calculating corresponding piston error value of the image by carrying out a Left-subtracting-right (LSR) algorithm on these peak values; and inputting the calculated piston error value to a closed loop control algorithm to get a control signal and eliminating the piston error according to the control signal.

Preferably, the optical system may further comprise a feedback adjusting device which is configured to receive the control signal from the processing device, and to control an actuate system for the main mirror in the co-phasing system in a feedback manner according to the control signal to eliminate the piston error.

Although the present invention has been particularly illustrated and described by referring to typical embodiments of the present invention, it should be understood by those skilled in the art that these embodiments can be modified in forms or details without departing from the spirit and scope of the present invention defined by the accompany claims.

The invention claimed is:

1. A method for improving capability of resisting image noise of a co-phasing system of a dispersed fringe sensor applied for an optical system comprising a main mirror system, a dispersed fringe sensor and a processing device, which comprises the following steps:
   carrying out a coarse co-phasing adjustment on the main mirror system by utilizing the dispersed fringe sensor until the coarse co-phasing of the main mirror system is stabilized in a closed loop;
   collecting a two dimensional dispersed fringe image by the dispersed fringe sensor;
   the processing device is configured to carry out the following steps:
   1) superposing the dispersed fringe image along a dispersed direction so as to convert the two dimensional dispersed fringe image to a one dimensional image along an interferential direction;
   2) extracting peak values of the main peak, a left side lobe and a right side lobe of the one dimensional image along the interferential direction, and calculating corresponding piston error value of the image by carrying out a Left-subtracting-right LSR algorithm on these peak values; and
   inputting the calculated piston error value to a closed loop control algorithm to get a control signal and eliminating the piston error according to the control signal.

2. The method for improving capability of resisting image noise of a co-phasing system of a dispersed fringe sensor according to claim 1, wherein the main mirror in the co-phasing system is a segmented mirror, an optical synthetic imaging aperture or a long baseline interferential telescope.

3. The method for improving capability of resisting image noise of a co-phasing system of a dispersed fringe sensor according to claim 1, further comprising displaying the calculated piston error value.

4. The method for improving capability of resisting image noise of a co-phasing system of a dispersed fringe sensor according to claim 1, wherein a moving mechanism of the main mirror in the co-phasing system is controlled in a feedback manner according to the control signal to eliminate the piston error.

5. An optical system comprising a main mirror system, a dispersed fringe sensor and a processing device, wherein the main mirror in the co-phasing system is a segmented mirror, an optical synthetic imaging aperture or a long baseline interferential telescope, the main mirror system is configured to collect optical signals;

the dispersed fringe sensor is configured to carry out a coarse co-phasing adjustment on the main mirror system until the coarse co-phasing of the main mirror system is stabilized in a closed loop, and is configured to collect two dimensional dispersed fringe images;

the processing device is configured to carry out the following steps: superposing the dispersed fringe image along a dispersed direction so as to convert the two dimensional dispersed fringe image to a one dimensional image along an interferential direction; extracting peak values of the main peak, a left side lobe and a right side lobe of the one dimensional image along the interferential direction, and calculating corresponding piston error value of the image by carrying out a Left-subtracting-right (LSR) algorithm on these peak values; and inputting the calculated piston error value to a closed loop control algorithm to get a control signal and eliminating the piston error according to the control signal.

6. The optical system according to claim 5, wherein the main mirror in the co-phasing system is a segmented mirror, an optical synthetic imaging aperture or a long baseline interferential telescope.

7. The optical system according to claim 5, further comprising a display configured to display the calculated piston error value.

8. The optical system according to claim 5, further comprising a feedback adjusting device which is configured to receive the control signal from the processing device, and to control an actuate system for the main mirror in the co-phasing system in a feedback manner according to the control signal to eliminate the piston error.

* * * * *